UNITED STATES PATENT OFFICE.

ALFRED FERDINAND POULLAIN-DUMESNIL, OF VASCŒUIL, EURE, FRANCE.

SPECIAL FERTILIZER FOR PLANTS.

SPECIFICATION forming part of Letters Patent No. 261,038, dated July 11, 1882.

Application filed November 11, 1881. (No specimens.) Patented in France April 25, 1881, No. 142,511; in Belgium April 26, 1881, No. 54,482; in England April 26, 1881, No. 1,804, and in Austria December 3, 1881, No. 36,342.

*To all whom it may concern:*

Be it known that I, ALFRED FERDINAND POULLAIN-DUMESNIL, a citizen of the French Republic, residing at Vascœuil, Eure, France, have invented an Improvement in Special Fertilizers for Plants, of which the following is a specification.

My invention has for its object the production of a substance or material in which the roots of plants may be embedded in lieu of soil or earth, whereby the plants may be the better nourished and the better fitted for the adornment of rooms and for decorative purposes in general. Plants set in soil require to be placed in pots and to be watered frequently. These potted plants are heavy, very liable to be broken in transportation, uncleanly, and unhealthy when used in sleeping-rooms. The plants do not in many cases thrive well in such pots, owing to the cramping of the roots and the lack of proper ventilation. There are also some very delicate plants which will not bear transplanting in earth or soil.

My invention avoids all of these objectionable features, and enables any one with a moderate amount of care and skill to transplant and grow any plant and to transport it safely to any distance.

In carrying out my invention I employ some porous, filamentous, or fibrous material for a base, which will serve to absorb and retain moisture, preferring ordinary moss, which may be found in damp woods and low grounds, as a cheap and suitable material for my purpose. With the moss I incorporate a nutritive fertilizing material of some kind, which should be rich in nitrogen and the phosphates, preferring for the purpose substances of organic origin. This nutritive material is first brought to as near an impalpable condition as possible, and then incorporated with the moss. The moss should be rendered damp and somewhat viscid by spraying it with or dipping it in milk, so that the nutritive material may the better adhere thereto. After the moss has been charged with the nutritive material it should be dried sufficiently to remove the excess of moisture, which otherwise is liable to bring on fermentation when the moss is compressed, and thus become unhealthy.

In setting the plants it is important that the roots should not be injured in pulling or digging them up. The soil should be shaken and washed from the roots and the roots bedded in the prepared moss by arranging them horizontally or circularly. This transplanting requires some care and intelligence, for the success of the operation depends upon the preservation of the roots in their integrity. If this is properly attended to, the plant will thrive and gain in vigor and beauty much more rapidly than where set in soil. Costly herbaceous, bulbous, and woody plants may be set in this manner at all seasons and employed for decorative purposes. The size of the plant is of no consequence. Plants of any size or kind, either bearing fruit or only foliage and flowers, may be transplanted into beds of my prepared moss and used for decorating halls, tables, or public monuments for temporary purposes.

As receptacles for the prepared moss, baskets of some perforated material may be used, wire, bamboo, or wood being suitable for the purpose. As the moss is very light, the receptacles need not be very rigid or heavy, and where the plants are to be transported I prefer not to employ fragile materials, such as glass, porcelain, &c.

The beauty and health of the plants are assured by the free circulation of air, which only my method renders possible. I avoid all excess of moisture, which is uncleanly, and preserve the necessary humidity of the moss, which it loses by evaporation, by slightly sprinkling it occasionally with a syringe or other spraying device. This is also efficacious in removing dust from the leaves of plants.

I also grow the plants from the seed by my method. In an ordinary hot-bed in the spring or autumn I make a bed of prepared moss and cover it thinly with earth or garden-mold, and on this sow the seed. As soon as the roots form they pass through the earth, enter the prepared moss, and there develop numerous little roots, the abundance of which assures the future beauty of the plants. At the time of transplanting, an additional quantity of the prepared moss should be added to that in which the roots have taken hold, to give room for their further development and extension.

Tap-rooted plants, (*Baraginacea, Papaveracea*, &c.,) which it is impossible to transplant, the seeds of which are sown as above described, when supplied with additional moss, give off auxiliary roots from their tap-root, which allows them to be transplanted to apartments or to garden-beds, even in the sunshine.

My prepared moss may be employed to good advantage in covering the roots of delicate, easily-frozen plants—roses, for example—in the autumn, to protect them against the inclemency of winter. Not only are the plants thus protected from injury, but the slow decomposition of the nutritive substances incorporated with the moss causes a considerable growth of new roots; but the principal advantage derived from the employment of my prepared moss in connection with the earth-culture of plants is that it advances the plants rapidly in their growth and produces at once in poor soils effects that can only be produced after many years' use of fertilizers in the usual way. In wet heavy soils the effect of the use of my prepared moss is observable the first year, owing to the improved aeration and the rich tonic nourishment afforded the roots of the plant.

My prepared moss may be modified by the addition of other substances—as, for example, sulphuret of carbon, or, better still, sulphocarbonate of potassium, when it serves also as an insecticide. This is very useful as a remedy for phylloxera, the formidable grape-pest. When impregnated with the insecticide known as "fichets" it will inevitably destroy the wood-lice which infect the plants.

As a substitute for moss, shredded sponge may be employed; but I prefer moss by reason partly of its cheapness and decorative appearance.

I am of course aware that plants have been bedded in moss, and that it is common to apply fertilizers to the soil in the culture of plants; but I am not aware that moss and other fibrous substances have ever been treated with plant-food for the production of an article for sale and use, as herein set forth.

Having thus described my invention, I claim—

1. As an improved article for bedding and growing plants, a fibrous absorbent material—as moss—impregnated with a fertilizing substance in the state of an impalpable powder—as the phosphates and nitrogenous substances—the said powder being made to adhere by means of milk applied to the moss, substantially as and for the purposes set forth.

2. The method herein described of preparing moss or other absorbent material for the bedding and culture of plants, which consists in first wetting the moss with an adhesive fluid, then impregnating the moss with a fertilizing substance in the state of an impalpable powder, and then drying the moss to remove the moisture, whereby fermentation is prevented, substantially as set forth.

In witness whereof I have hereunto signed my name in the presence of two subscribing witnesses.

ALFRED FERDINAND POULLAIN-DUMESNIL.

Witnesses:
ROBT. M. HOOPER,
DE ROUGEMONT.